United States Patent
Levesque

(10) Patent No.: US 9,436,282 B2
(45) Date of Patent: Sep. 6, 2016

(54) CONTACTOR-BASED HAPTIC FEEDBACK GENERATION

(71) Applicant: Immersion Corporation, San Jose, CA (US)

(72) Inventor: Vincent Levesque, Montreal (CA)

(73) Assignee: IMMERSION CORPORATION, San Jose, CA (US)

(*) Notice: Subject to any disclaimer, the term of this patent is extended or adjusted under 35 U.S.C. 154(b) by 57 days.

(21) Appl. No.: 13/803,103

(22) Filed: Mar. 14, 2013

(65) Prior Publication Data

US 2014/0267065 A1    Sep. 18, 2014

(51) Int. Cl.
| | | |
|---|---|---|
| *G06F 3/041* | (2006.01) | |
| *G06F 3/01* | (2006.01) | |
| *G06F 3/0488* | (2013.01) | |

(52) U.S. Cl.
CPC ............. *G06F 3/016* (2013.01); *G06F 3/041* (2013.01); *G06F 3/0488* (2013.01); *G06F 3/0416* (2013.01); *G06F 2200/1636* (2013.01); *G06F 2203/04104* (2013.01); *G06F 2203/04106* (2013.01)

(58) Field of Classification Search
None
See application file for complete search history.

(56) References Cited

U.S. PATENT DOCUMENTS

| | | | | |
|---|---|---|---|---|
| 8,098,235 B2* | 1/2012 | Heubel | ................... | G06F 3/016 345/156 |
| 8,378,798 B2* | 2/2013 | Bells | ........................ | G06F 3/016 340/407.1 |
| 8,493,354 B1* | 7/2013 | Birnbaum | ............... | G06F 3/016 340/407.2 |
| 8,686,952 B2* | 4/2014 | Burrough | ................ | G06F 3/016 345/156 |
| 9,063,570 B2* | 6/2015 | Weddle | ................... | G06F 3/016 |
| 2008/0284751 A1* | 11/2008 | Hsu | ....................... | G06F 3/0488 345/173 |
| 2009/0051667 A1* | 2/2009 | Park | ....................... | G06F 3/016 345/173 |
| 2009/0244023 A1* | 10/2009 | Kim et al. | ..................... | 345/173 |
| 2010/0156823 A1* | 6/2010 | Paleczny | ................. | G06F 3/041 345/173 |
| 2010/0192109 A1* | 7/2010 | Westerman | ......... | G06F 3/04883 715/863 |
| 2010/0279738 A1* | 11/2010 | Kim | ........................ | G06F 3/016 455/566 |
| 2011/0102349 A1* | 5/2011 | Harris | ..................... | G06F 3/041 345/173 |
| 2012/0032891 A1* | 2/2012 | Parivar | ......................... | 345/173 |
| 2012/0056838 A1* | 3/2012 | Harris | ................... | G06F 3/0436 345/173 |
| 2012/0194466 A1* | 8/2012 | Posamentier | ........... | G06F 3/041 345/174 |

(Continued)

FOREIGN PATENT DOCUMENTS

| | | |
|---|---|---|
| EP | 2075671 A1 | 7/2009 |
| WO | 03065192 A1 | 8/2003 |
| WO | 2008042745 A2 | 4/2008 |

OTHER PUBLICATIONS

M. Sato et al.; "Touché: Enhancing Touch Interaction on Humans, Screens, Liquids, and Everyday Objects"; Session: Brain & Body; CHI 2012; May 5-10, 2012; Austin, Texas, USA; pp. 483-492.

C. Holtz et al.; "Understanding Touch"; Session: Touch 2: Tactile & Targets; CHI 2011; May 7-12, 2011; Vancouver, BC, Canada; pp. 2501-2510.

(Continued)

*Primary Examiner* — Dismery Mercedes
(74) *Attorney, Agent, or Firm* — Miles & Stockbridge P.C.

(57) ABSTRACT

A system that generates haptic effects senses contact on an interface by a contactor/object. The system then determines one or more properties of the contactor and generates a type of haptic effect in response to the contact. The type of haptic effect is based at least on the one or more properties.

26 Claims, 4 Drawing Sheets

(56) References Cited

U.S. PATENT DOCUMENTS

2012/0256848 A1* 10/2012 Madabusi
              Srinivasan ............ G06F 1/1626
                                          345/173
2013/0201155 A1*  8/2013 Wu ..................... G06F 3/03547
                                          345/174
2014/0192003 A1*  7/2014 Kim ....................... G06F 3/041
                                          345/173
2014/0247240 A1*  9/2014 Sinclair ................. G06F 3/0488
                                          345/174

OTHER PUBLICATIONS

C. Harrison et al.; "TapSense: Enchancing Finger Interaction on Touch Surfaces"; UIST'11; Oct. 16-19, 2011; Santa Barbara; CA, USA; ACM 978-1-4503-0716—Jan. 11, 2010.

C. Holtz; "The Generalized Perceived Input Point Model and How to Double Touch Accuracy by Extracting Fingerprints"; CHI 2010; Apr. 10-15, 2010; Atlanta, Georgia, USA; ACM 978-1-60558-929—Sep. 10, 2004.

* cited by examiner

CONTACTOR-BASED HAPTIC FEEDBACK GENERATION

FIELD

One embodiment is directed generally to a haptic feedback system, and in particular to a haptic feedback system based upon contactor properties.

BACKGROUND INFORMATION

Electronic device manufacturers strive to produce a rich interface for users. Conventional devices use visual and auditory cues to provide feedback to a user. In some interface devices, kinesthetic feedback (such as active and resistive force feedback) and/or tactile feedback (such as vibration, texture, and heat) is also provided to the user, known collectively as "haptic feedback" or "haptic effects". Haptic feedback can provide cues that enhance and simplify the user interface. Specifically, vibration effects, or vibrotactile haptic effects may be useful in providing cues to users of electronic devices to alert the user to specific events, or provide realistic feedback to create greater sensory immersion within a simulated or virtual environment.

Haptic feedback has also been increasingly incorporated in portable electronic devices, such as cellular telephones, personal digital assistants ("PDA"s), smartphones, portable gaming devices, and a variety of other portable electronic devices. For example, some portable gaming applications are capable of vibrating in a manner similar to control devices (e.g., joysticks, etc.) used with larger-scale gaming systems that are configured to provide haptic feedback. Additionally, devices such as cellular telephones and PDAs are capable of providing various alerts to users by way of vibrations. For example, a cellular telephone can alert a user to an incoming telephone call by vibrating. Similarly, a PDA or smartphone can alert a user to a scheduled calendar item or provide a user with a reminder for a "to do" list item or calendar appointment.

Increasingly, portable devices are moving away from physical buttons in favor of touchscreen-only interfaces. This shift allows increased flexibility, reduced parts count, and reduced dependence on failure-prone mechanical buttons and is in line with emerging trends in product design. When using the touchscreen input device, a mechanical confirmation such as pressing a button or other user interface action can be simulated with haptics.

In order to generate vibration effects, many devices utilize some type of actuator or haptic output device. Actuators used for this purpose include an electromagnetic actuator such as an Eccentric Rotating Mass ("ERM") in which an eccentric mass is moved by a motor, a Linear Resonant Actuator ("LRA") in which a mass attached to a spring is driven back and forth, or a "smart material" such as piezoelectric, electroactive polymers or shape memory alloys. Haptic output devices may also be devices such as electrostatic friction ("ESF") devices or ultrasonic surface friction ("USF") devices, or devices that induce acoustic radiation pressure with an ultrasonic haptic transducer. Other devices use a haptic substrate and a flexible or deformable surface, and devices that provide projected haptic output such as a puff of air using an air jet, etc. These actuators are able to produce strong magnitude haptic outputs. These actuators are also used to provide feedback to the user when operating a touch sensitive input of a touchscreen device.

SUMMARY

One embodiment is a system that generates haptic effects. The system senses contact on an interface by a contactor/object. The system then determines one or more properties of the contactor and generates a type of haptic effect in response to the contact. The type of haptic effect is based at least on the one or more properties.

DETAILED DESCRIPTION

One embodiment is a system with an interface that is contacted by a "contactor" (i.e., a body part or object that is in contact with the interface). The system determines properties of the contactor, and generates haptic effects that can vary based on the properties. Therefore, the haptic effects can be adaptable to whatever object/contactor contacts the system.

Figure 1:
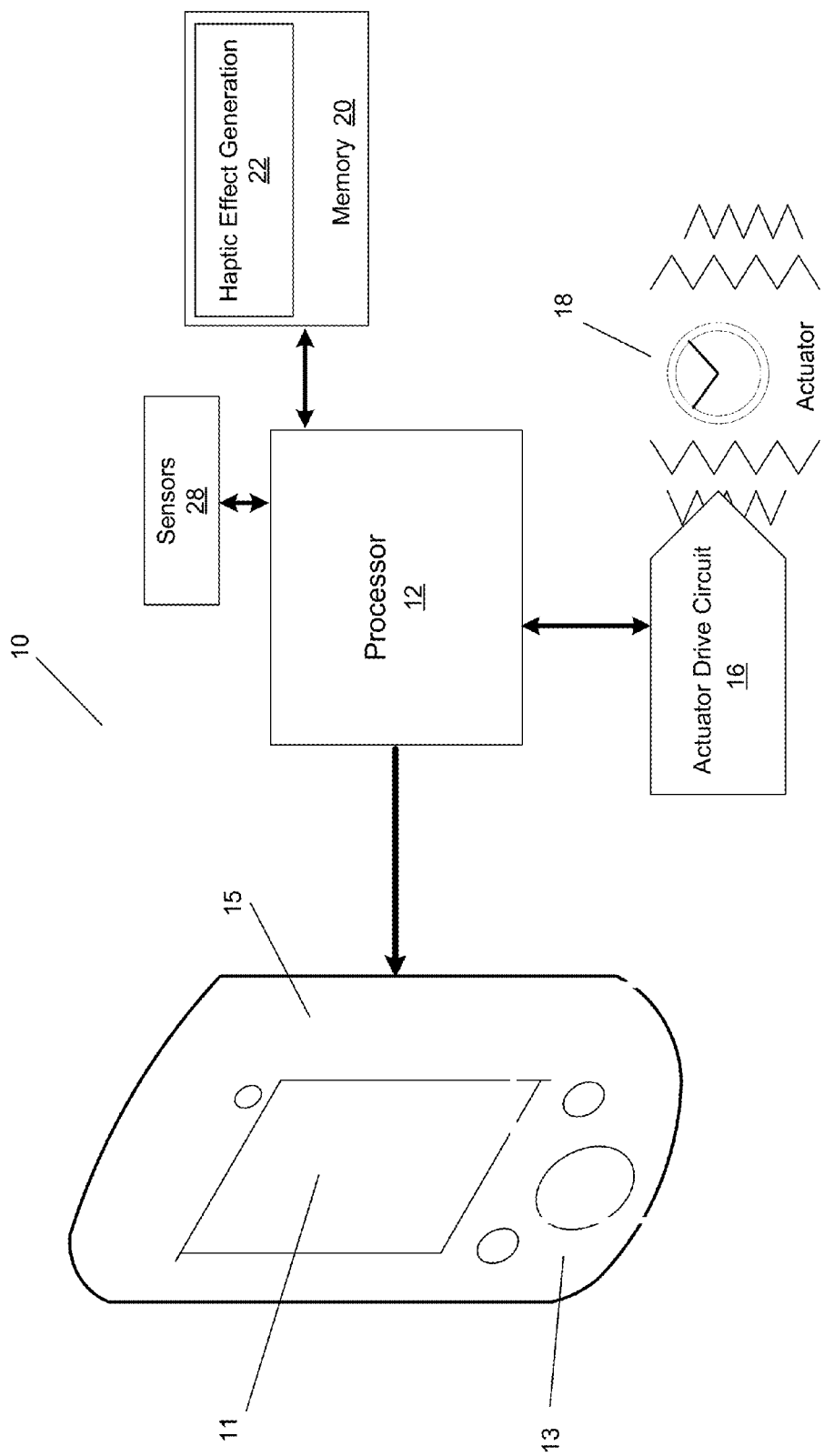
FIG. 1 is a block diagram of a haptically-enabled system according to embodiments of the invention.

FIG. 1 is a block diagram of a haptically-enabled mobile device or system 10 that can implement an embodiment of the present invention. System 10 includes a touch sensitive surface 11 or other type of user interface mounted within a housing 15, and may include mechanical keys/buttons 13. Internal to system 10 is a haptic feedback system that generates vibrations on system 10. In one embodiment, the vibrations are generated on touch surface 11 or on any other part of system 10.

The haptic feedback system includes a processor or controller 12. Coupled to processor 12 is a memory 20 and an actuator drive circuit 16, which is coupled to an actuator 18. Processor 12 may be any type of general purpose processor, or could be a processor specifically designed to provide haptic effects, such as an application-specific integrated circuit ("ASIC"). Processor 12 may be the same processor that operates the entire system 10, or may be a separate processor. Processor 12 can decide what haptic effects are to be played and the order in which the effects are played based on high level parameters. In general, the high level parameters that define a particular haptic effect include magnitude, frequency and duration. Low level parameters such as streaming motor commands could also be used to determine a particular haptic effect. A haptic effect may be considered "dynamic" if it includes some variation of these parameters when the haptic effect is generated or a variation of these parameters based on a user's interaction.

Processor 12 outputs the control signals to actuator drive circuit 16, which includes electronic components and circuitry used to supply actuator 18 with the required electrical current and voltage (i.e., "motor signals") to cause the desired haptic effects to be generated. System 10 may include more than one actuator 18, and each actuator may include a separate drive circuit 16, all coupled to a common processor 12. Memory device 20 can be any type of storage device or computer-readable medium, such as random access memory ("RAM") or read-only memory ("ROM"). Memory 20 stores instructions executed by processor 12, such as operating system instructions. Among the instructions, memory 20 includes a haptic effect generation module 22 which is instructions that, when executed by processor 12, generate contactor-based haptic effects, as disclosed in more detail below. Memory 20 may also be located internal to processor 12, or any combination of internal and external memory.

Touch surface 11 recognizes touches, and may also recognize the position and magnitude of touches on the surface. The data corresponding to the touches is sent to processor 12, or another processor within system 10, and processor 12 interprets the touches and in response generates haptic effect signals. Touch surface 11 may sense touches using any sensing technology, including capacitive sensing, resistive sensing, surface acoustic wave sensing, pressure sensing, optical sensing, etc. Touch surface 11 may sense multi-touch contacts and may be capable of distinguishing multiple touches that occur at the same time. Touch surface 11 may be a touchscreen that generates and displays images for the user to interact with, such as keys, buttons, dials, etc., or may be a touchpad with minimal or no images.

System 10 may be a handheld device, such a cellular telephone, personal digital assistant ("PDA"), smartphone, computer tablet, gaming console, etc., or may be any other type of device that provides a user interface and includes a haptic effect system that includes one or more actuators. The user interface may be a touch sensitive surface, or can be any other type of user interface such as a mouse, touchpad, mini-joystick, scroll wheel, trackball, door knob, game pads or game controllers, etc.

Actuator 18 may be any type of actuator, including an Eccentric Rotating Mass ("ERM") in which an eccentric mass is moved by a motor, a Linear Resonant Actuator ("LRA") in which a mass attached to a spring is driven back and forth, or a "smart material" such as piezoelectric, electroactive polymers or shape memory alloys. Although device 10 illustrates an actuator 18 that is used to create vibratory haptic feedback, haptic output devices may also be devices that use electrostatic friction ("ESF"), ultrasonic surface friction ("USF"), devices that induce acoustic radiation pressure with an ultrasonic haptic transducer, devices that use a haptic substrate and a flexible or deformable surface, devices that provide projected haptic output such as a puff of air using an air jet, etc., or any type of non-mechanical or non-vibratory device.

System 10 further includes one or more sensors 28. Sensors 28 provide sensor data and device sensor signals to processor 12, such as whole device acceleration, gyroscopic information, ambient information, or proximity information (e.g., the proximity of an object to interface 11). Device sensor signals may be any type of sensor input enabled by a device, such as from an accelerometer or gyroscope, or any type of ambient sensor signal such as from a microphone, photometer, thermometer or altimeter, or any type of bio monitor such as skin or body temperature, blood pressure ("BP"), heart rate monitor ("HRM"), electroencephalograph ("EEG"), or galvanic skin response ("GSR"), or information or signals received from a remotely coupled device.

As described, in one embodiment system 10 detecting some properties of the contactor or object that is contacting interface 11. This process involves the sensing of physical quantities by sensor 28 and the interpretation of the sensed data by a processor 12. One purpose of detecting the properties is to identify the contactor or an aspect of the contactor.

In one embodiment, the properties of a contactor/object contacting an input area of a device is determined by classifying the sound of the object's impact upon the input area. This approach can identify a passive tool, such as a pen or stylus, and it can also identify different parts of the finger, such as the tip, fingerpad, knuckle, and nail of the finger. Different materials produce different acoustic signatures and have different resonant frequencies. One component of the embodiment detects and tracks the position of the object using one or more of optical, resistive, and capacitive touchscreens. A second component of the embodiment listens, segments, and classifies impacts of the object on the input area using acoustic features. After a classification of the input has been made, it is paired with the last event from the input area. One embodiment uses surface acoustic transmission to identify the object.

Another embodiment uses capacitive touch sensing to identify objects. Electromagnetic signal frequency sweeps are used to capture a range of frequencies from an object. As a result, embodiments can determine the configuration of fingers holding a device, such as a single finger, multiple fingers, or the entire palm. Diffuse infrared illumination can capture touch dimensions such as finger orientation and hand shape.

These and other embodiments are used to identify an object contacting an input area of a device, and subsequently provide haptic feedback to a user. The haptic feedback could be modified based upon sensed properties of an object contacting an input area of a device. This would provide a constant haptic stimuli or produce the same intended effect, such as notification of a certain event. The following examples demonstrate some of concepts and features of embodiments of the invention in which a type of generated haptic effect is based at least in part on contactor properties.

Figure 2A:
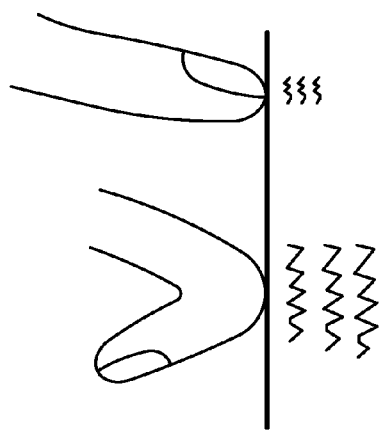
FIGS. 2a-d are illustrations of example haptic effects generated based on contactor properties according to embodiments of the invention.

An input area of a device may be contacted with a fingerpad or a finger knuckle, both of which would produce vibrotactile feedback. However, the knuckle may be less sensitive than the fingerpad, so the intensity of the vibrations can be increased for the knuckle in order to compensate for its lower tactile sensitivity, as illustrated in FIG. 2*a*. The waveform for the knuckle may also be modified to produce a smoother waveform so that the feedback is not perceived negatively on the knuckle, since some effects are known to be unpleasant when applied to a bony body part as opposed to a fleshy body part.

An input area of a device may be contacted with a pencil or stylus instead of a finger part. For example, a tablet can use its knowledge of tactile sensitivity to adapt the feedback accordingly. A pencil or stylus may dampen vibrations and therefore require stronger feedback. On the other hand, other vibration patterns may cause the stylus to bounce uncomfortably against the input area.

Further, properties of the contactor may allow for the detection of a gloved hand or finger, which cannot feel ESF type haptic effects and would feel damped vibrations. In one embodiment, a glove could potentially be detected from the sound of the contact, or from the detection of a contact by sound or vibration without a touch input on a capacitive touchscreen. In this embodiment, the properties of the contactor would include the glove feature, and the haptic effect can be selected based on this property (e.g., select only a vibration based haptic effect and increase the magnitude so the vibrations are felt through the glove).

An embodiment in the form of a doorknob (i.e., the doorknob is an "interface") may produce haptic feedback in order to indicate the state of the door and room behind it, for example to suggest that the door should be opened only for emergencies. The doorknob could sense the grip of the user and adapt haptic feedback (e.g., vibrations) generated on the doorknob. A loose grip with two fingers, for example, may require less haptic effect force than a strong grip with the whole hand. The feedback may otherwise be startling when using two fingers, or barely perceptible when using the whole hand.

Embodiments of the invention can normalize the haptic feedback, so that the same perceived feedback will be received by the user, regardless of the contactor used. As a result, the haptic feedback will produce the same intended effect, such as a notification of an event or a particular outcome.

Figure 2B:
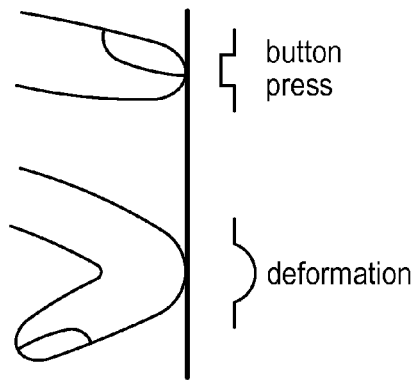

Conversely, the sensed properties, or measured parameters of an object contacting an input area of a device can also be used in conjunction with the user interface of an application to produce appropriate and distinct haptic effects. As an example, a video game on a smartphone could distinguish between taps with a fingernail or a finger knuckle. Each object would produce a distinct haptic feedback to the user, as illustrated in FIG. 2b, where a vibratory "button press" simulation haptic effect is generated in response to a fingertip touch, and a deformable surface based haptic effect is generated in response to a knuckle tap. In a more specific example, slicing a "banana" shown on a touchscreen display with a fingernail would feel different than crushing a "coconut" shown on a touchscreen display with a knuckle because two different types of haptic effects will be generated. Therefore, the intended perception given to the user would be different for each intended action as generated by the user interface.

Figure 2C:
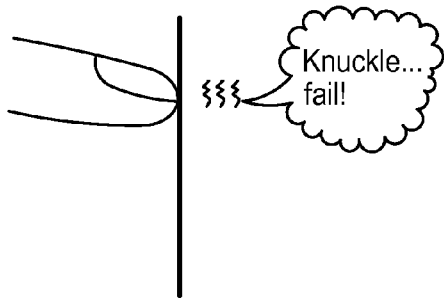

Haptic effects may also be used to confirm the correct detection of an object. As an example, a knuckle tap may produce a loud haptic effect, while a fingernail tap may produce a series of sharp vibrations. Therefore, the misinterpretation of the input would be immediately obvious to the user, as illustrated in FIG. 2c, in which the haptic effect indicates the type of touch detected, making it easy to notice when a fingerpad tap has been detected as a knuckle tap by mistake. As another example, sliding gestures may produce distinct texture effects, using ESF. This would immediately be perceived by the user as a correctly or incorrectly interpreted input.

Figure 2D:
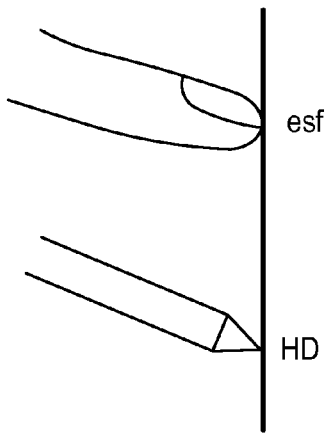

The parameters of a contactor/object contacting an input area of a device can be measured and interpreted to determine an appropriate modality for feedback. As an example, a feedback generation system may switch between ESF and vibrotactile feedback, depending upon whether the input area was contacted by a fingerpad or stylus, as illustrated in FIG. 2d. If the input area was contacted by a typical stylus, then ESF could not be used as it is only capable of being felt by a finger, or some types of specialized styluses or inanimate objects. Conversely, the feedback generation system could use visual or audio feedback when it determines the stylus would be unable to feel a vibrotactile haptic feedback.

Figure 3:
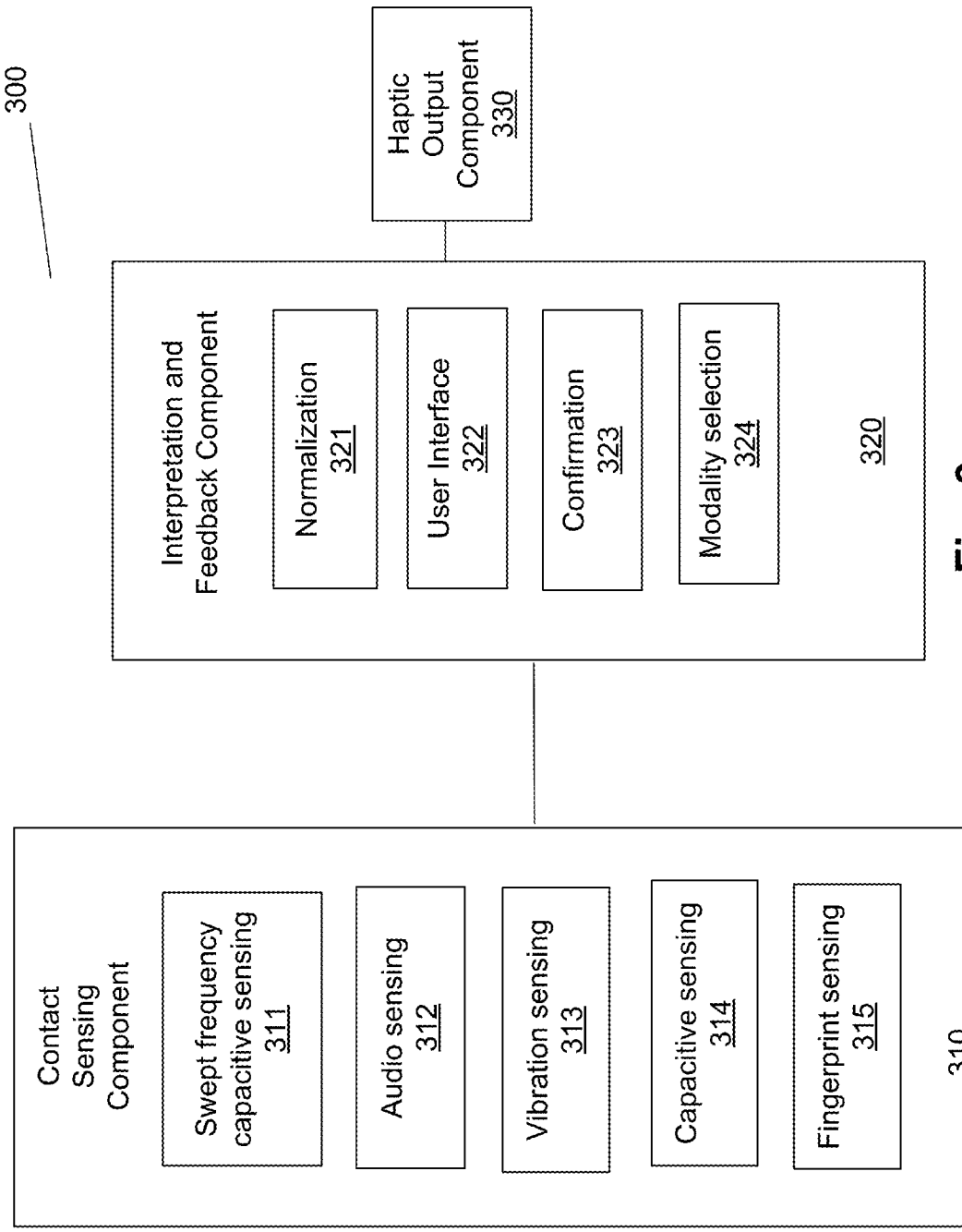
FIG. 3 is a block diagram of a haptic feedback generation system according to embodiments of the invention.

FIG. 3 is a block diagram of a haptic feedback generation system 300 according to embodiments of the invention. In one embodiment, the functionality of system 300 is implemented by system 10 of FIG. 1. The haptic feedback generation system 300 contains a contactor sensing component 310, an interpretation and feedback component 320, and a haptic output component 330. The contactor sensing component 310 is capable of detecting certain properties of a contactor/object that contacts an input area of a device or any other area. A processor receives and interprets sensed data from physical quantities of contactor parameters. Embodiments may include some or all of the components shown in FIG. 3.

Contactor sensing component 310 includes a swept frequency capacitive sensing component 311. Capacitive sensing detects contact from an object by applying a signal at a single frequency and measuring any distortions in a return signal caused by the object's capacitive coupling. Swept frequency capacitive sensing scans through a range of frequencies and measures the outcome to obtain a capacitive profile. The shape of the profile provides information about the contact between the object and the input surface, thereby identifying the object. The shape of this profile can provide information about the contact between a hand and the instrumented surface. For example, a doorknob can detect the difference between a single-finger's touch, a two-finger pinch, a circular grasp or a full grasp. A smartphone can detect the difference between a single-finger touch, a two-finger pinch or pinching with all five fingers. Contactor sensing component 310 includes an audio sensing component 312. Sounds emitted by contact between an object and an input area can be captured by a microphone and analyzed. Differences between a fingerpad, the tip of a finger, a finger knuckle, a fingernail, and both ends of a pen can be detected.

Contactor sensing component 310 includes a vibration sensing component 313. Vibrations caused by contact between an object and an input area can be captured and analyzed by one or more accelerometers.

Contactor sensing component 310 includes a capacitive sensing component 314. Capacitive sensors are capable of determining the area of contact between a fingerpad and a surface. The change in size and shape of the area over time can be used to estimate the pose of a finger. For example, an ellipsoid area that slowly shrinks from one end may indicate that a finger is moving from a flat orientation to an angled orientation.

Contactor sensing component 310 includes a fingerprint sensing component 315. A fingerprint sensor can indicate the part of the finger pad that is in contact with a surface, which can be used to infer a finger posture. For example, a swirl on the right side of the fingerpad may indicate that the left side of the fingerpad is touching a surface.

Haptic feedback generation system 300 also includes an interpretation and feedback component 320, which interprets the contactor properties and determines how they will impact the haptic output. Interpretation and feedback component 320 includes a normalization component 321, which modifies the output based on the tactile properties of the contactor (i.e., the object contacting the input area of the device). Normalization component 321 insures that the haptic feedback is uniform. Therefore, the intensity of a vibration can be modified based on the tactile sensitivity of different parts of the contactor to return a consistent haptic feedback. For example, the intensity of a vibration can be modified based on the tactile sensitivity of different parts of the finger—fingerpad, knuckle, nail, etc. Similarly, the affective outcome can be taken into account to make sure that a stimuli for the nail and fingerpad are both perceived as positive despite differences in perception. In an example using ESF, the conductivity and dryness of different parts of the fingerpad could be taken into account to ensure a uniform response.

Interpretation and feedback component 320 includes a user interface component 322. The haptic feedback output is tied into normal user interface operations. The haptic feedback needs to change with contactor-dependent features of the user interface. Therefore, different user interface outcomes and states lead to respective different haptic feedback.

Interpretation and feedback component 320 includes a confirmation component 323. The detected contactor is reflected back into different haptic effects and textures, which facilitates corrections on erroneous contactor detection. Confirmation component 323 reduces the impact of detection errors and provides improved awareness of current input mode, thereby reducing cognitive load.

Interpretation and feedback component 320 includes a modality selection component 324. The output modality is selected based upon a mapping between the contactor and a preferred modality in different contexts. Therefore, modality selection component 324 provides an optimum feedback for all contactors, despite a difference in haptic perception.

Haptic feedback generation system 300 also contains a haptic output component 330. The haptic feedback of haptic output component 330 (such as actuator 18 of FIG. 1) includes, but is not limited to vibration actuators, ESF displays, electrotactile arrays, and force feedback devices. The haptic feedback is generated by one or more physical actuators, driving electronics, and associated software, such as a rendering engine that may reside internal or external to the device's operating system.

Figure 4:
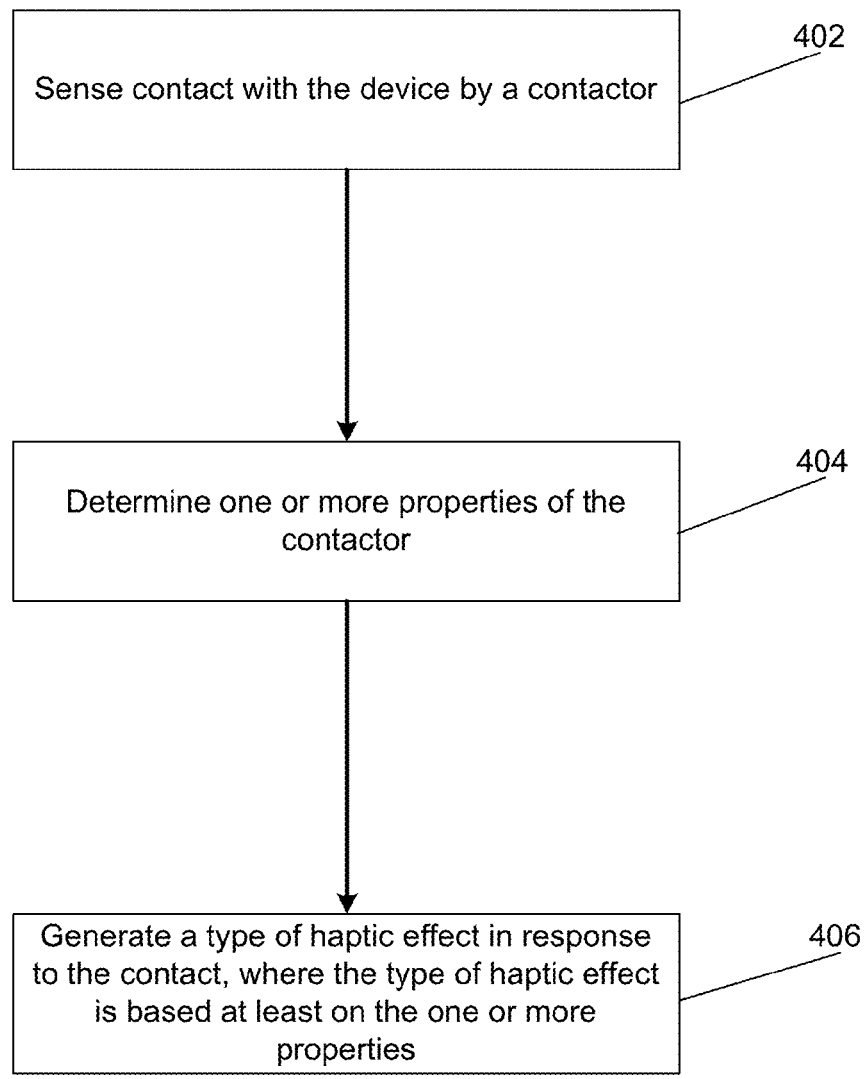
FIG. 4 is a flow diagram of the functionality of the system of FIG. 1 when generating a haptic effect in response to an object contacting an input area of a device in accordance with an embodiment.

FIG. 4 is a flow diagram of the functionality of system 10 of FIG. 1 when generating a haptic effect in response to an object contacting an input area of a device in accordance with an embodiment. In one embodiment, the functionality of the flow diagram of FIG. 4, is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

At 402, system 10 senses contact with the device by a contactor. For example, a finger or stylus can contact a touchscreen.

At 404, system 10 determines one or more properties of the contactor. For example, the system can determine if the contactor is a fingerpad, fingernail or knuckle, or an inanimate object such as a stylus, pencil erasure or pen tip.

At 406, the system generates a type of haptic effect in response to the contact, where the type of haptic effect is based at least on the one or more properties. The type of haptic effect may vary from other haptic effects based on a choice of haptic output devices (i.e., modality), such as a choice between a vibratory haptic device, an ESF device, or a deformable haptic device. Further, the type of haptic effect may vary from other haptic effects by varying parameters of the haptic effect such as magnitude, frequency or duration parameters. The parameters can be varied so that the haptic effect is normalized in that it will feel the same to the user regardless of the type/properties of the contactor.

As described above, properties of a contactor when it makes contact with a touchscreen can be used to generate haptic effects. In other embodiments, assumed properties of a contactor can be used before the contactor makes contact. When generating types of haptic effects, the rendering of realistic haptic effects is often done by synchronizing the progression of the effect with spatial motion. For example, a kinesthetic haptic can follow a specific force profile as a mechanical button is moved within its travel range. This typically includes a ramp-up of the force, followed by a sudden drop as the button is triggered. Similar effects can be produced with vibrotactile actuators.

On touchscreens, on the other hand, haptic effects that result from simulated widget motion that conceptually occurs perpendicular to the screen are generally limited to temporal profiles due to the lack of actual travel. Therefore, in one embodiment, sensor 28 of FIG. 1 is a proximity sensor that can be used to detect the contactor before it contacts the interface of the device. The proximity sensing is used to produce spatial deflection profiles as the fingerpad, for example, approaches the surface. The effects can be laid out spatially such that the actual impact with the touchscreen occurs at a critical moment in the deflection profile. For example, a vibration could gradually increase as the finger approaches the screen and the impact against the touchscreen could occur at the moment at which the button is actually triggered.

In another embodiment, the proximity sensor is used to activate a haptic output device in advance of contact to avoid processing delays. For example, an ESF texture can be activated before the fingerpad touches the screen so that the correct effect is felt without any processing delay as soon as the touch occurs. In this embodiment, the processing delay between the touch detection and the activation of the output is calculated rather than an actuation delay, which is nearly immediate in the case of ESF.

In another embodiment, the system uses the time beefore a touch event, as determined by the proximity sensor, to perform complex computations in advance of the touch input. For example, the time could be used to load a model of the surface about to be touched, perform physics simulations, and prepare haptic effects such as waveforms.

In another embodiment, a default contactor is determined so that the properties of the contactor are determined before the contactor contacts the interface. The proximity sensor, as discussed above, can then be used in conjunction with the contactor properties to determine the haptic effects. If the contactor turns out to be something other than the default contactor, the system can then properly identify the object and respond accordingly. For example, a first actuator may be activated in response to an anticipated contact of a contactor. When the contactor contacts the input area, a second actuator may be activated in response to the actual input if the actual contactor is different than the default or assumed contactor.

As disclosed, contactor properties are used to determine a type of haptic effect to generate in response to a contact by the contactor. The type may be chosen so that the haptic effect is perceived the same regardless of the contactor, or to provide information that is dependent on the contactor properties.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A method of generating haptic effects on a device, the method comprising:
   sensing a first contact with the device by a contactor, wherein the contactor is associated with a user;
   determining for the first contact an identity of a first part out of a plurality of possible parts of the contactor that has contacted the device;
   determining a first tactile sensitivity that corresponds to the first part, wherein the first tactile sensitivity is a first measurement of an ability of the user to feel a haptic effect at the first part;
   in response to the first contact, generating a first haptic effect and applying the first haptic effect to the first part, wherein the first haptic effect comprises first haptic effect parameters based at least on the first tactile sensitivity;
   sensing a second contact with the device by the contactor;

determining for the second contact an identity of a second part out of a plurality of possible parts of the contactor that has contacted the device, wherein the second part is different than the first part;

determining a second tactile sensitivity that corresponds to the second part and is different than the first tactile sensitivity, wherein the second tactile sensitivity is a second measurement of the ability of the user to feel the haptic effect at the second part; and in response to the second contact, generating a second haptic effect and applying the second haptic effect to the second part, wherein the second haptic effect comprises second haptic effect parameters, based at least on the second tactile sensitivity, that are varied in comparison to the first haptic effect parameters to cause the applied second haptic effect to feel approximately the same to the user as the applied first haptic effect.

2. The method of claim 1, further comprising generating a distinct type of haptic effect in response to the first contact, wherein the distinct type of haptic effect is generated by determining parameters of the distinct type of haptic effect.

3. The method of claim 2, wherein the first and second haptic effects are vibratory haptic effects, and the first and second haptic effect parameters comprise at least one of magnitude, frequency or duration.

4. The method of claim 2, wherein the distinct type of haptic effect is generated by selecting a haptic output device from a plurality of haptic output devices for the haptic effect.

5. The method of claim 4, wherein the plurality of haptic output devices comprise at least one of a vibratory device, an electrostatic friction device, or a deformable surface.

6. The method of claim 1, wherein the plurality of possible parts of the contactor comprises a stylus, a fingerpad, a fingernail or a knuckle.

7. The method of claim 2, wherein the distinct type of haptic effect is further based at least on a confirmation of a correct detection of the contactor.

8. The method of claim 1, wherein the sensing comprises determining a proximity of the contactor to the device, and the sensing is performed before the contact.

9. The method of claim 1, wherein the sensing comprises receiving a signal from a touch surface of the device.

10. A non-transitory computer-readable medium having instructions stored thereon that, when executed by a processor, cause the processor to generate haptic effects on a device, the generating comprising:

sensing a first contact with the device by a contactor, wherein the contactor is associated with a user;

determining for the first contact an identity of a first part out of a plurality of possible parts of the contactor that has contacted the device;

determining a first tactile sensitivity that corresponds to the first part, wherein the first tactile sensitivity is a first measurement of an ability of the user to feel a haptic effect at the first part;

in response to the first contact, generating a first haptic effect and applying the first haptic effect to the first part, wherein the first haptic effect comprises first haptic effect parameters based at least on the first tactile sensitivity;

sensing a second contact with the device by the contactor;

determining for the second contact an identity of a second part out of a plurality of possible parts of the contactor that has contacted the device, wherein the second part is different than the first part;

determining a second tactile sensitivity that corresponds to the second part and is different than the first tactile sensitivity, wherein the second tactile sensitivity is a second measurement of the ability of the user to feel the haptic effect at the second part; and in response to the second contact, generating a second haptic effect and applying the second haptic effect to the second part, wherein the second haptic effect comprises second haptic effect parameters, based at least on the second tactile sensitivity, that are varied in comparison to the first haptic effect parameters to cause the applied second haptic effect to feel approximately the same to the user as the applied first haptic effect.

11. The computer-readable medium of claim 10, further comprising generating a distinct type of first haptic effect in response to the contact, wherein the distinct type of haptic effect is generated by determining parameters of the distinct type of haptic effect.

12. The computer-readable medium of claim 11, wherein the first and second haptic effects are a vibratory haptic effect, and the first and second haptic effect parameters comprise at least one of magnitude, frequency or duration.

13. The computer-readable medium of claim 11, wherein the distinct type of haptic effect is generated by selecting a haptic output device from a plurality of haptic output devices for the haptic effect.

14. The computer-readable medium of claim 13, wherein the plurality of haptic output devices comprise at least one of a vibratory device, an electrostatic friction device, or a deformable surface.

15. The computer-readable medium of claim 10, wherein the plurality of possible parts of the contactor comprises a stylus, a fingerpad, a fingernail or a knuckle.

16. The computer-readable medium of claim 11, wherein the distinct type of haptic effect is further based at least on a confirmation of a correct detection of the contactor.

17. The computer-readable medium of claim 10, wherein the sensing comprises determining a proximity of the contactor to the device, and the sensing is performed before the contact.

18. The computer-readable medium of claim 10, wherein the sensing comprises receiving a signal from a touch surface of the device.

19. A system comprising:

an interface that senses a first contact by a contactor, wherein the contactor is associated with a user;

a haptic output device coupled to the interface;

a contactor property module that determines for the first contact an identity of a first part out of a plurality of possible parts of the contactor that has contacted the device;

determines a first tactile sensitivity that corresponds to the first part, wherein the first tactile sensitivity is a first measurement of an ability of the user to feel a haptic effect at the first part;

in response to the first contact, generates a first haptic effect and applying the first haptic effect to the first part using the haptic output device, wherein the first haptic effect comprises first haptic effect parameters based at least on the first tactile sensitivity;

senses a second contact with the device by the contactor;

determines for the second contact an identity of a second part out of a plurality of possible parts of the contactor that has contacted the device, wherein the second part is different than the first part;

determines a second tactile sensitivity that corresponds to the second part and is different than the first tactile sensitivity, wherein the second tactile sensitivity is a second measurement of the ability of the user to feel the haptic effect at the second part; and in response to the second contact, generates a second haptic effect and applies the second haptic effect to the second part using the haptic output device, wherein the second haptic effect comprises second haptic effect parameters, based at least on the second tactile sensitivity, that are varied in comparison to the first haptic effect parameters to cause the applied second haptic effect to feel approximately the same to the user as the applied first haptic effect.

20. The system of claim 19, wherein the haptic output device comprises an actuator, and the first and second haptic effects are vibratory haptic effects.

21. The system of claim 20, wherein the first and second haptic effect parameters comprise at least one of magnitude, frequency or duration.

22. The system of claim 19, wherein the interface comprises a proximity sensor that senses the contact before the contactor contacts the device.

23. The system of claim 19, wherein the interface comprises a touchscreen.

24. The system of claim 19, wherein the interface comprises a doorknob.

25. The system of claim 19, further comprising generating a distinct type of haptic effect in response to the contact, wherein the distinct type of haptic effect is generated by determining parameters of the distinct type of haptic effect.

26. The system of claim 19, wherein the contactor property module further determines if the contactor is an inanimate object.

* * * * *